(12) United States Patent
Reiners et al.

(10) Patent No.: US 11,148,731 B2
(45) Date of Patent: Oct. 19, 2021

(54) PICKUP BOX HEADER AND INTEGRATED TOOLBOX ASSEMBLY

(71) Applicant: Ford Global Technologies, LLC, Dearborn, MI (US)

(72) Inventors: Robert Reiners, Grosse Ile, MI (US); Joshua Robert Hemphill, White Lake, MI (US); Jack Marchlewski, Saline, MI (US); Dragan B. Stojkovic, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/233,179

(22) Filed: Dec. 27, 2018

(65) Prior Publication Data

US 2019/0126993 A1    May 2, 2019

Related U.S. Application Data

(62) Division of application No. 15/380,042, filed on Dec. 15, 2016, now Pat. No. 10,202,152.

(51) Int. Cl.
| | |
|---|---|
| *B60R 9/06* | (2006.01) |
| *B62D 29/00* | (2006.01) |
| *B60R 11/06* | (2006.01) |
| *B62D 33/027* | (2006.01) |

(52) U.S. Cl.
CPC .............. *B62D 29/008* (2013.01); *B60R 9/06* (2013.01); *B60R 11/06* (2013.01); *B62D 33/0273* (2013.01)

(58) Field of Classification Search
CPC ........... B60R 11/06; B60R 5/04; B60R 9/065; B62D 33/0273; B62D 29/008; B62D 33/02
USPC ......................................... 296/37.6; 224/404
See application file for complete search history.

(56) References Cited

U.S. PATENT DOCUMENTS

| | | | |
|---|---|---|---|
| D243,393 S | 2/1977 | Wynn | |
| 4,750,773 A | 6/1988 | Chapline et al. | |
| 5,924,615 A * | 7/1999 | McGarrah | B60R 9/00 296/37.6 |
| 6,068,319 A | 5/2000 | O'Brien | |
| 6,203,086 B1 | 3/2001 | Dirks et al. | |
| 6,328,365 B1 | 12/2001 | Adsit | |
| 6,464,277 B2 | 10/2002 | Wilding | |
| 8,857,684 B1 * | 10/2014 | Calvert | B60R 11/06 224/404 |

(Continued)

*Primary Examiner* — Stephen T Gordon
(74) *Attorney, Agent, or Firm* — David Coppiellie; Brooks Kushman P.C.

(57) ABSTRACT

A pickup truck box assembly including a header, a truck bed, an upper header rail, and a toolbox is provided. The truck bed has a forward end supporting the header, a rear end having a tailgate pivotally mounted thereto, and a pair of wheel wells disposed on opposing sides of the truck bed. The upper header rail may be secured at an upper portion of the header. The toolbox may include an extruded body defining a channel extending laterally a width of the truck bed. A lower surface of the body may be spaced from the truck bed a distance greater than a height of the wheel wells. First and second body side panels may be mounted to the truck bed and arranged with the toolbox to define sidewalls of the toolbox. The upper header rail and the toolbox may be formed by extrusion as a single component.

2 Claims, 6 Drawing Sheets

(56) References Cited

U.S. PATENT DOCUMENTS

| | | |
|---|---|---|
| 9,937,869 B2 | 4/2018 | Hemphill et al. |
| 10,202,152 B2 * | 2/2019 | Reiners ................ B62D 29/008 |
| 2002/0014505 A1 * | 2/2002 | Lance ....................... B60P 3/14 |
| | | 296/37.6 |
| 2002/0164225 A1 | 11/2002 | Snyder et al. |
| 2005/0017038 A1 | 1/2005 | Johnson |
| 2005/0121931 A1 | 6/2005 | Waye |

\* cited by examiner

PICKUP BOX HEADER AND INTEGRATED TOOLBOX ASSEMBLY

CROSS-REFERENCE TO RELATED APPLICATIONS

This application is a division of U.S. application Ser. No. 15/380,042 filed Dec. 15, 2016, now U.S. Pat. No. 10,202,152 issued Feb. 12, 2019, the disclosure of which is hereby incorporated in its entirety by reference herein.

TECHNICAL FIELD

This disclosure relates to assemblies for pickup truck boxes including an upper rail and an integrated toolbox.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly from the bed. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers. Stamped pickup truck box components may often be made from steel sheet metal. The components may form assemblies of multiple parts including multiple assembly steps.

SUMMARY

According to an aspect of the present disclosure, a pickup truck box assembly includes a header, an extruded upper rail, and a toolbox. The header includes a first flange extending at an angle away from a tailgate. The extruded rail includes a second flange for securing to the first flange. The toolbox is integrated with the rail and includes an extruded body having a rear wall, a forward wall, and a lower wall. The walls are arranged with one another to define a cell therebetween. A lid may be mounted to the forward wall for pivotal movement between at least a closed and an open position. The forward wall may define a cylinder-shaped channel extending laterally a length of the header. The lid may include a cylinder-shaped insertion segment extending laterally the length of the header and sized for insertion within the cylinder-shaped channel to facilitate the pivotal movement of the lid. Each of a pair of lateral channels may extend laterally beneath the cell and may be formed by an extrusion process with the walls. The extruded upper rail may be disposed between C-pillars of the pickup truck box providing additional stiffness to the pickup truck box. A truck bed may support the header. The toolbox and the upper rail may be arranged with one another such that the lower wall is spaced from the bed approximately 240 mm. Each of a first and second truck bed side panel may be mounted to a truck bed and arranged with the forward and lower walls to form sidewalls of the toolbox.

According to another aspect of the present disclosure, a pickup truck box assembly includes a header, a truck bed, an upper header rail, and a toolbox. The truck bed has a forward end supporting the header, a rear end having a tailgate pivotally mounted thereto, and a pair of wheel wells disposed on opposing sides of the truck bed. The upper header rail is secured at an upper portion of the header. The toolbox includes an extruded body defining a channel extending laterally a width of the truck bed. A lower surface of the body is spaced from the truck bed a distance greater than a height of the wheel wells. First and second body side panels may be mounted to the truck bed and arranged with the toolbox to define sidewalls of the toolbox. The upper header rail and the toolbox may be formed by extrusion as a single component. The extruded body may further include an interior surface and a vertical wall extending between the lower surface and the interior surface to define two cells extending a length of the toolbox. The upper header rail may define integrated attachments for receiving a portion of one of a headache rack and a tonneau cover. A toolbox lid may be mounted to the upper header rail for pivotal movement between at least a closed position in which access to the channel is prevented to an open position in which access to the channel is provided. An upper portion of the upper rail may define a cylinder-shaped channel extending laterally a length of the header. The lid may include a cylinder-shaped insertion segment extending laterally the length of the header and sized for insertion within the channel to facilitate pivotal movement of the lid.

According to a further aspect of the present disclosure, a toolbox integrated with a pickup truck header includes a rear wall, a forward wall, a lower wall, and a lid. The forward wall is for securing to an upper rail mounted to a header and including an upper end defining a channel extending laterally a length of the forward wall. The lower wall extends between the rear wall and the forward wall. The lid includes an extension sized for insertion within the channel to facilitate pivotal movement. The walls are sized such that the lower wall is spaced from a truck bed a distance of 240 mm when mounted to the pickup truck header. The channel may define a cylinder-shape and the extension may define a cylinder-shape. The forward wall may be mounted to a rear wall of an upper header rail of pickup truck box assembly by one of mechanical fasteners, a weld, and an adhesive. A vertical wall may extend between the lower wall and the toolbox interior surface to define two cells extending a length of the toolbox. The walls may define a fixed cross-section. The forward wall may define integrated attachments for receiving a portion of one of a headache rack and a tonneau cover.

The above aspects of the disclosure and other aspects will be apparent to one of ordinary skill in the art in view of the attached drawings and the following detailed description of the illustrated embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
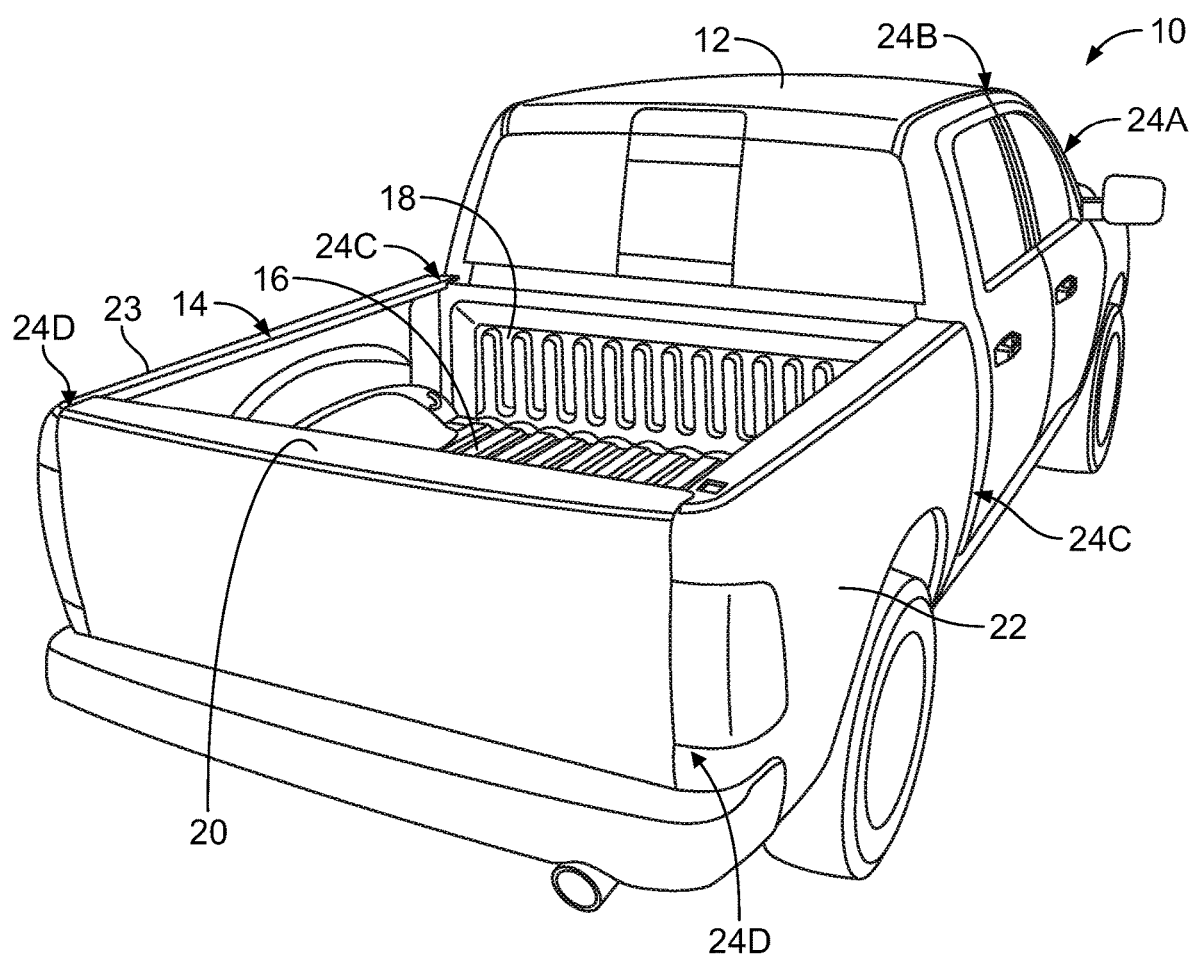
FIG. 1 is a rear perspective view of an example of a pickup truck.

Referring to FIG. 1, an example of a vehicle 10 is illustrated that includes a cabin 12 and a truck box 14 supported by a vehicle chassis (not visible in FIG. 1). The vehicle 10 may be, for example, a pickup truck comprising a majority of aluminum components. The truck box 14 includes a bed 16 having a forward end adjacent to the cabin 12 and a rear end opposite the forward end. The bed 16 supports a header 18 at the forward end and a tailgate 20 at the rear end. The tailgate 20 is pivotally mounted to the bed 16. The bed 16 also supports a first outer side panel 22 and a second outer side panel 23. In this example, the vehicle 10 includes an A-pillar region 24A, a B-pillar region 24B, a C-pillar region 24C, and a D-pillar region 24D. The illustrated vehicle 10 is a four door configuration, however other configurations, such as a two door configuration, may be adopted to incorporate the disclosed concepts. Alternate configurations may include different pillar region references than the vehicle 10.

The first outer side panel 22 and the second outer side panel 23 are secured to the header 18 at respective regions referred to as forward box pillar regions of the truck box 14 or the C-pillar regions 24C herein. The tailgate 20 pivots between an open position and a closed position. In the closed position as shown in FIG. 1, each lateral end of the tailgate 20 may be removably attached to the first outer side panel 22 and the second outer side panel 23 at respective regions referred to as rear box pillar regions or the D-pillar regions 24D herein.

Figure 3:
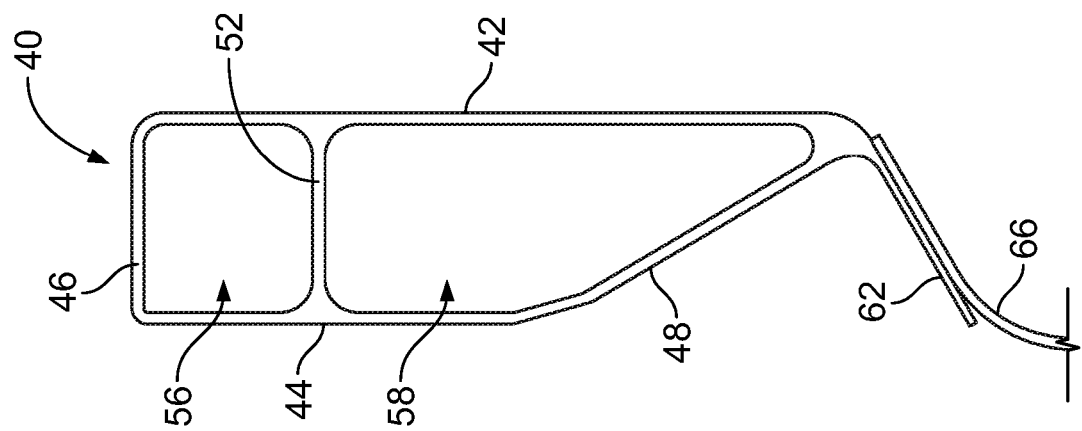
FIG. 3 is a side view of the example of the upper rail of FIG. 2.
Figure 2:
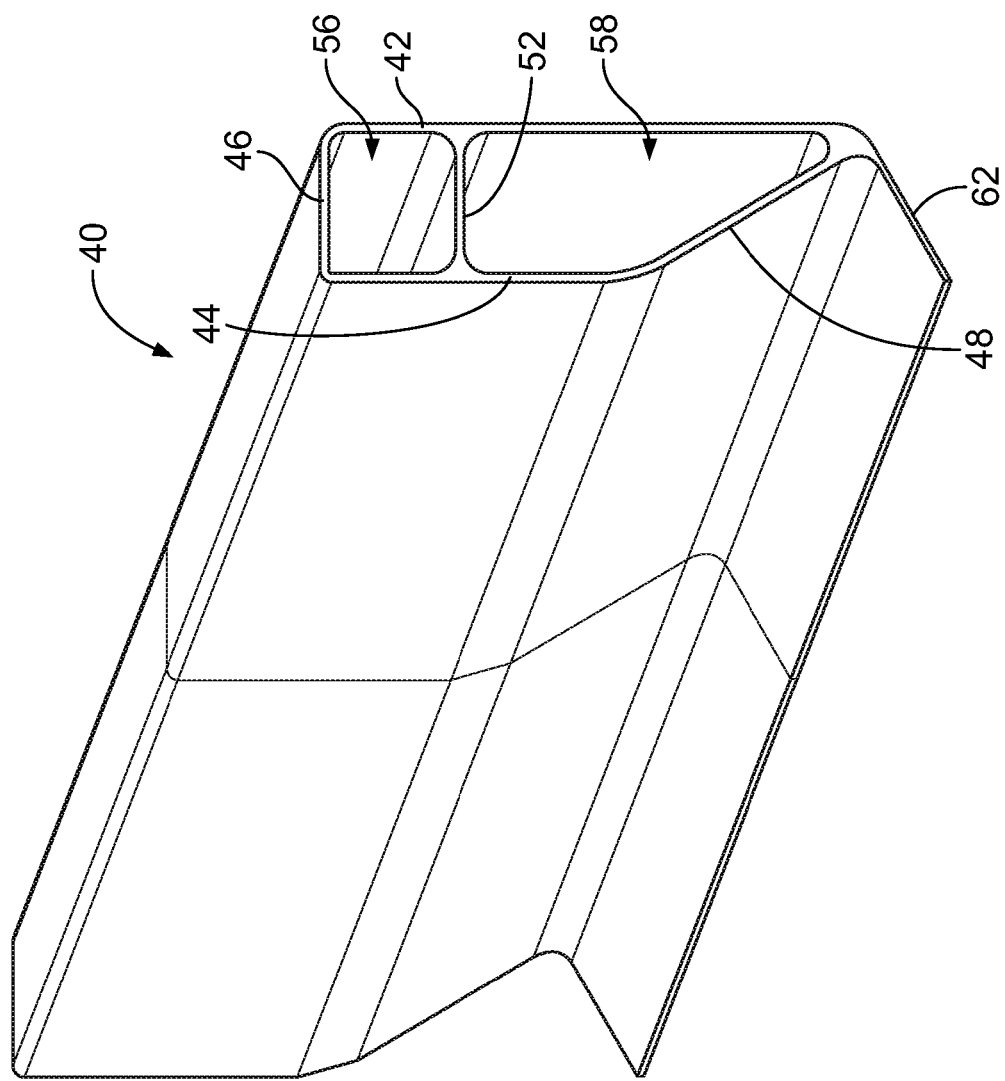
FIG. 2 is a rear perspective view of an example of an upper rail for a header of a pickup truck.

FIGS. 2 and 3 show an example of an upper rail for mounting to a header of a pickup truck box assembly, referred to generally as an upper rail 40 herein. The upper rail 40 includes a rear wall 42, a forward wall 44, an upper wall 46, and an angled wall 48. The rear wall 42 and the forward wall 44 may be oriented substantially parallel to one another. A mid-wall 52 may extend between the rear wall 42 and the forward wall 44. The walls may be arranged with one another to define a first channel 56 and a second channel 58. The channels form two cells extending along the upper rail 40 that provide additional strength and rigidity to the upper rail 40.

The upper rail 40 may be formed by an extrusion process to form components having a fixed or uniform cross-sectional profile. Heated material is extruded through a die of a desired cross-section. A ram of a press pushes the material blank toward and through the die. Extruding the upper rail 40 provides an option to have varied component thicknesses at various portions of the upper rail 40. For example, an increased material thickness may span laterally a length of the upper rail 40 or an increased material thickness may be located at a portion of the upper rail 40 in which the rear wall 42 and the angled wall 48 join one another to provide additional stiffness. Further, extrusion processes are typically less complex than stamping processes and produce components with improved finishes in comparison to stamped components. As such, the upper rail 40 may define a continuous and fixed cross-sectional profile.

An angled flange 62 extends from the rear wall 42 and the angled wall 48. The angled flange 62 may extend forward at an angle greater than ninety degrees relative to the rear wall 42. The angled flange 62 may be secured to a flange of a header, such as flange 66. The angled flange 62 may extend forward at an angle sufficient to provide spacing for a tool to apply fasteners to secure the angled flange 62 to flange 66. The angled flange 62 and the flange 66 may be secured to one another by a variety of joining processes such as welding or mechanical fastening. In another example, the upper rail 40 may be secured to the header by an extension member extending from the rear wall 42 without an angle. In yet another example, the upper rail 40 may define integrated attachments for receiving a portion of a vehicle component such as a headache rack or a tonneau cover.

Figure 5:
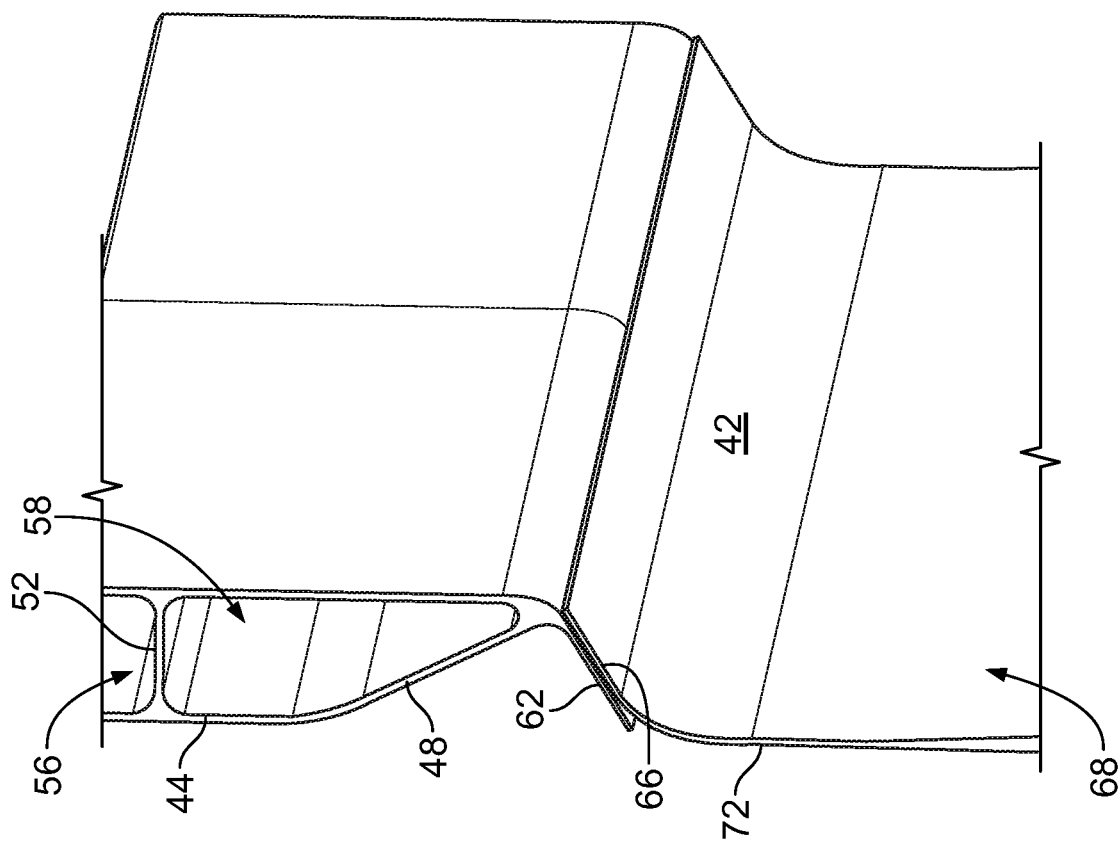
FIG. 5 is a front perspective view of the example of the upper rail of FIG. 2 shown mounted to a header of a pickup truck.
Figure 4:
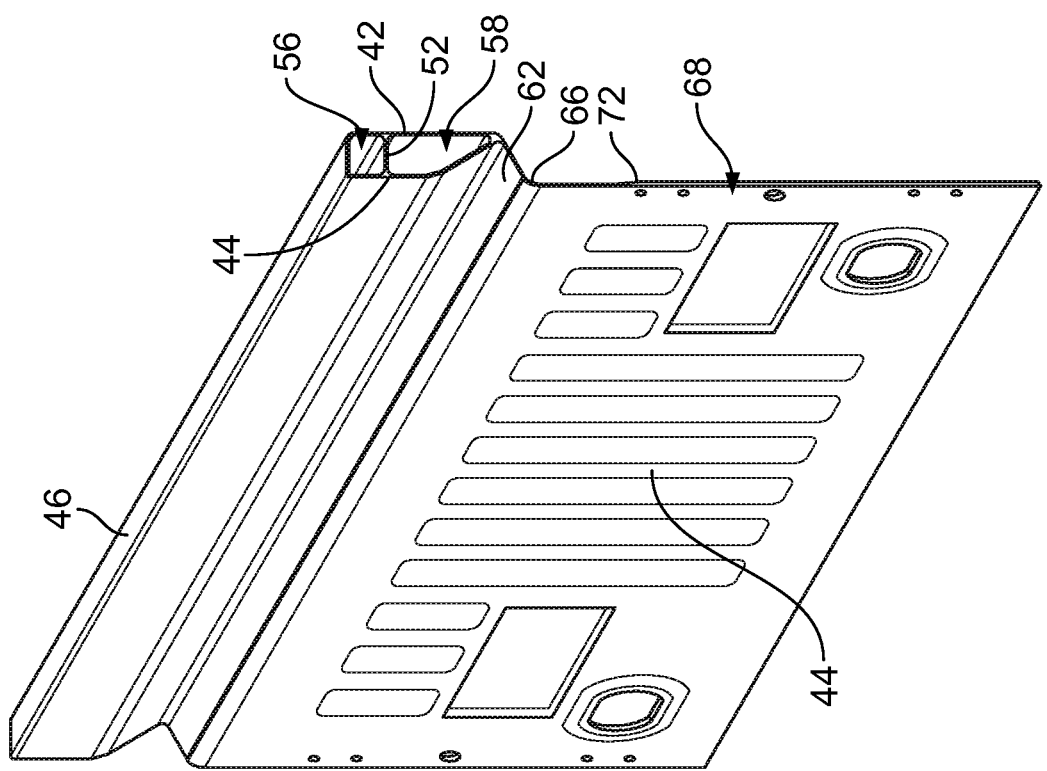
FIG. 4 is a rear perspective view of the example of the upper rail of FIG. 2 shown mounted to a header of a pickup truck.

FIGS. 4 and 5 show the upper rail 40 mounted to the flange 66 of a header 68. The flange 66 may extend forward at an angle comparable to the angle of the angle flange 62. The angled flange 62 and the flange 66 may be arranged with one another such that a body portion 72 of the header 68 is substantially parallel with the rear wall 42 and the forward wall 44 of the upper rail 40.

Figure 6:
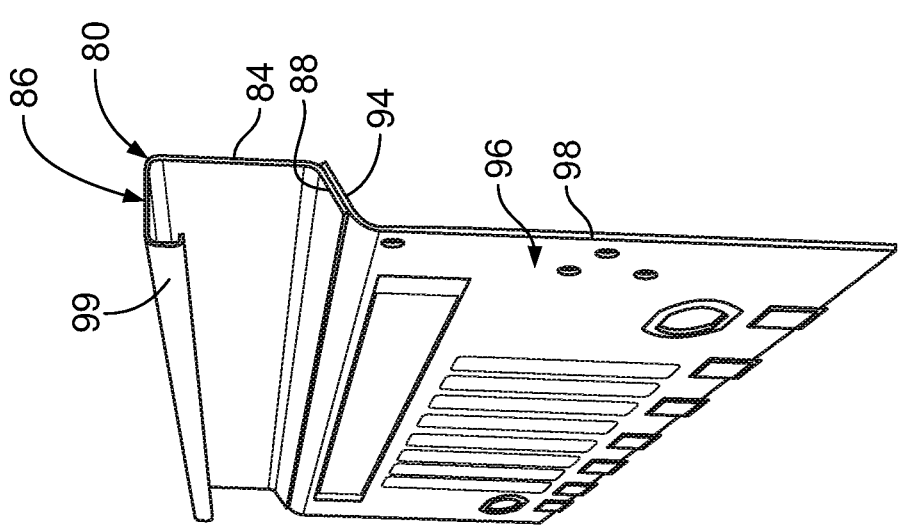
FIG. 6 is a front perspective view of another example of an upper rail for a header of a pickup truck.

FIG. 6 shows another example of an upper rail for securing to a header of a pickup truck assembly, referred to generally as an upper rail 80 herein. The upper rail 80 includes a forward wall 84, an upper wall 86, and an angled flange 88. The angled flange 88 may extend from the forward wall 84 at an angle greater than ninety degrees relative to the rear wall 42. The upper rail 80 may be formed by an extrusion process as described above. The angled flange 88 may be secured to a flange 94 of a header 96. The flange 94 may extend from a body portion 98 of the header 96 at an angle comparable to the angle of the angled flange 88. The angle flange 88 and the flange 94 may be arranged with one another such that the forward wall 84 and the body portion 98 are oriented substantially parallel with one another. In another example, the upper rail 40 may be secured to the header by an extension member extending from the rear wall 42 without an angle. An extension 99 may extend from the upper wall 86 at substantially ninety degrees. The extension 99 may assist in providing additional stiffness to the upper rail 80 and may also provide a softer edge to increase customer appeal.

Figure 7:
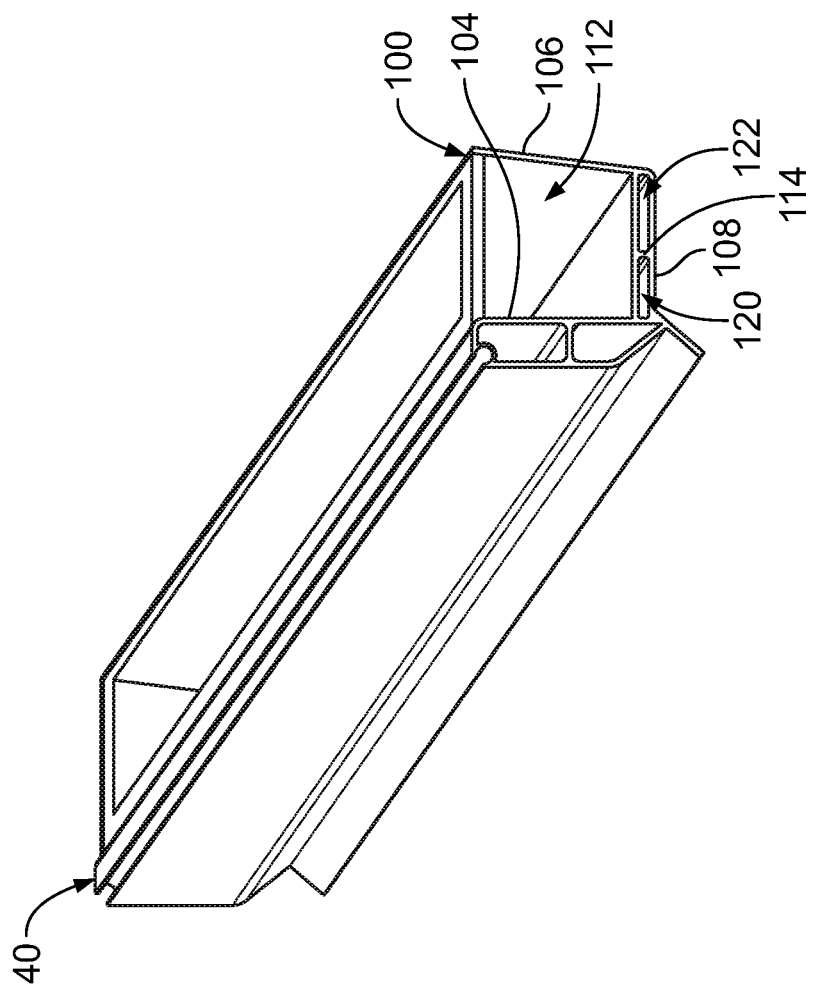
FIG. 7 is a rear perspective view of an example of an upper rail assembly for a pickup truck including an example of a toolbox.
Figure 8:
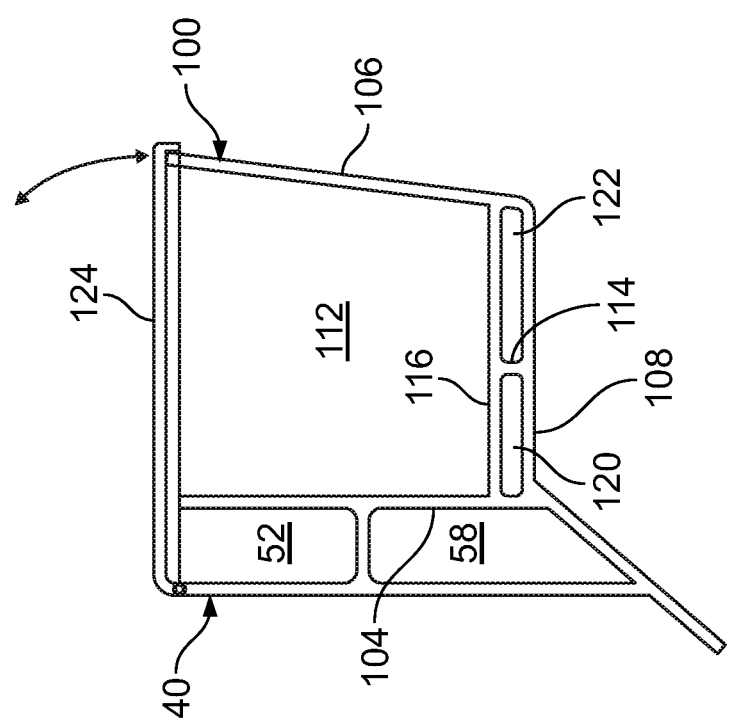
FIG. 8 is a side view of a portion of the upper rail assembly of FIG. 7 showing a toolbox lid in a closed position.

FIGS. 7 and 8 show an example of a toolbox integrated with the upper rail 40, referred to generally as a toolbox 100 herein. The toolbox 100 may be formed by an extrusion process as described above. The toolbox 100 includes a rear wall 104, a forward wall 106, and a lower wall 108. The walls may be arranged with one another to define a channel 112. In one example, the channel 112 may have a width of 100 mm to 250 mm. The channel 112 may be sized to receive, for example, tools or other objects. A vertical wall 114 may extend between the lower wall 108 and an interior wall 116 to define a first cell 120 and a second cell 122. Each of the first cell 120 and the second cell 122 extend a length of the toolbox 100.

Prior art toolboxes for pickup trucks are typically a separate component, bulky, and cut down on available space within a pickup truck box assembly. The toolbox 100 addresses these issues. The lower wall 108 of the toolbox 100 may be spaced from the truck bed at a distance equal to or greater than a height of wheel wells of the truck box. For example, the lower wall 108 may be spaced from a truck bed approximately 240 mm where a height of the respective wheel wells is approximately 233 mm. This spacing may provide for materials to be positioned within the truck box and extend to the header. In comparison, prior art toolboxes rest just above the truck bed.

FIG. 8 shows an example of a lid 124 mounted for rotation to the upper rail 40. The lid 124 may rotate between at least an open position to provide access to contents within the toolbox 100 and a closed position in which the lid 124 prevents access to contents within the toolbox 100. The lid 124 may be mounted to the upper rail 40 by, for example, a hinge mechanism to facilitate the movement between the open position and the closed position.

Figure 9:
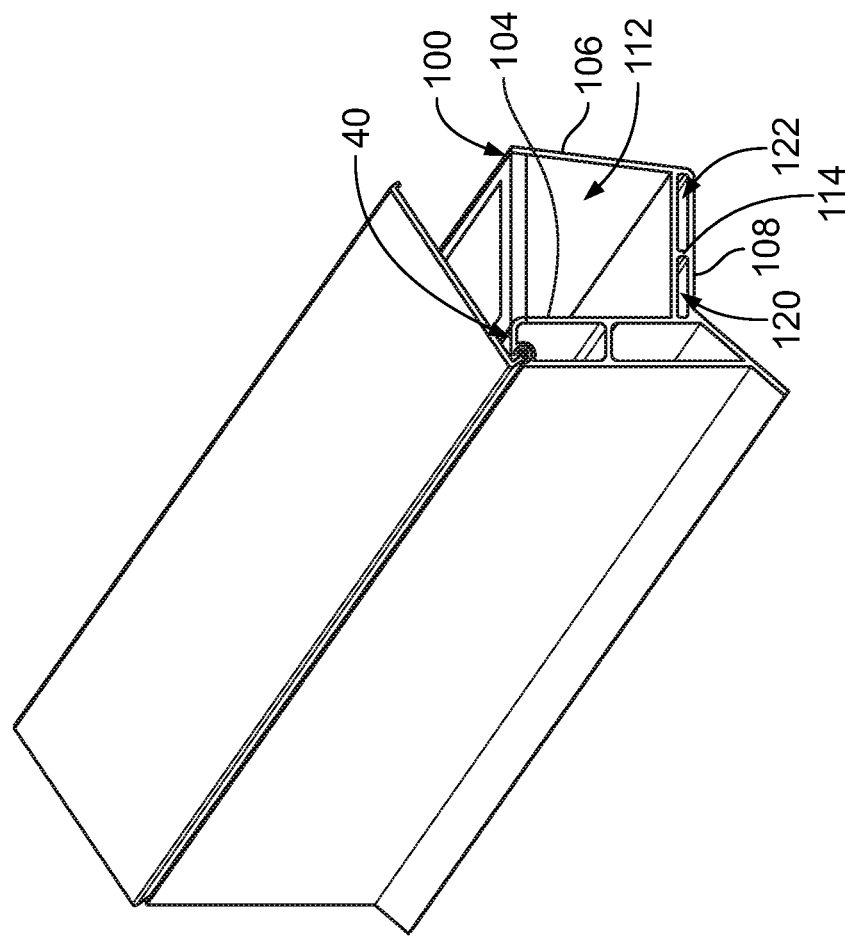
FIG. 9 is a front perspective view of an example of an upper rail assembly including a toolbox.
Figure 10:
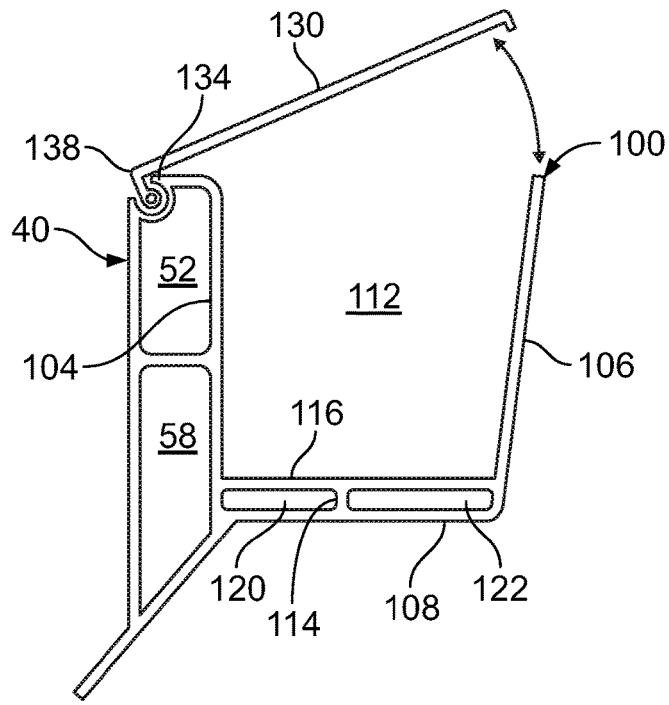
FIG. 10 is a side view of the example of the upper rail assembly of FIG. 9 showing a toolbox lid in a partially open position.

FIGS. 9 and 10 show another example of a lid 130 mounted for rotation to the upper rail 40. The lid 130 may rotate between at least an open position to provide access to contents within the toolbox 100 and a closed position in which the lid 130 prevent access to contents within the toolbox 100. In this example, the upper rail 40 includes a channel 134 extending laterally along an upper portion of the upper rail 40. The lid 130 includes an insertion member 138 sized for insertion within the channel 134. In this example, the channel 134 defines a substantially cylindrical shape and the insertion member 138 defines a matching shape to permit rotation of the lid 130. Other suitable shapes are available for the channel 134 and the insertion member 138 to facilitate rotation of the lid 130.

Figure 11:
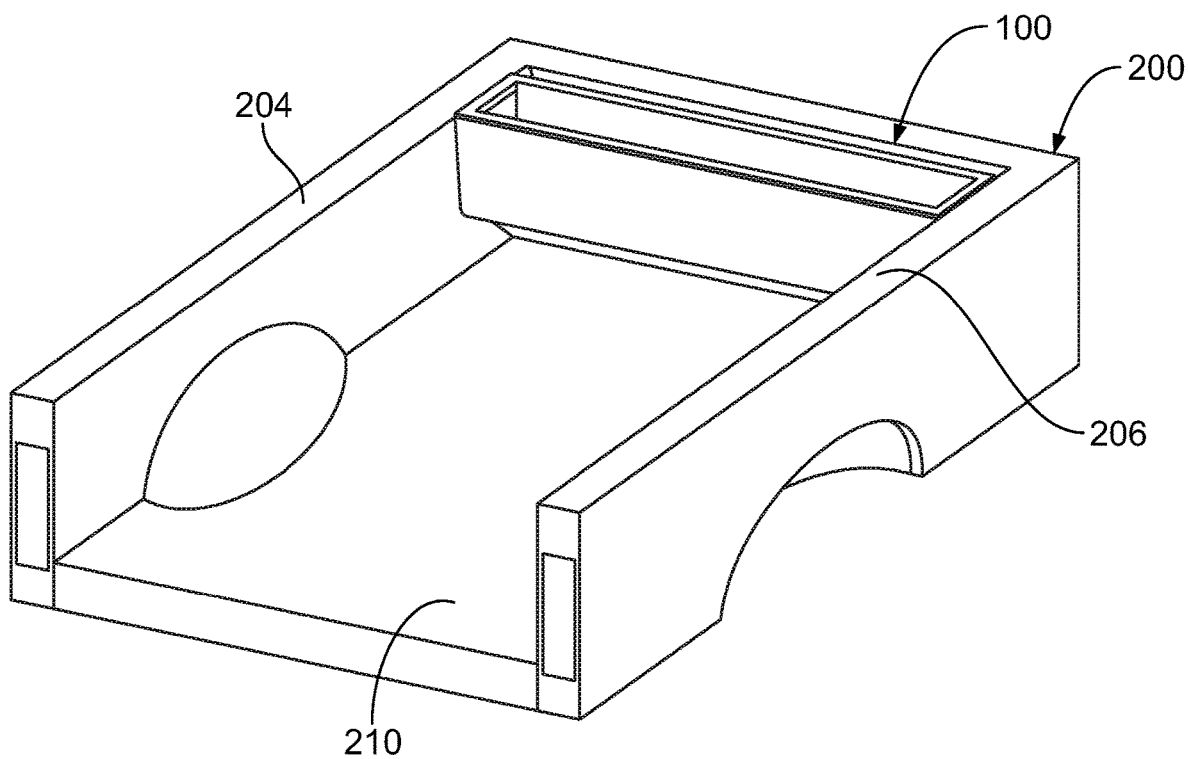
FIG. 11 is a rear perspective view of an example of the upper rail assembly of FIG. 9 shown mounted to a pickup truck box.

FIG. 11 shows an example of the toolbox 100 mounted within a pickup truck box assembly, referred to generally as a truck box assembly 200. The truck box assembly 200 includes a first body side panel 204, a second body side panel 206, and a header 208 mounted to a truck bed 210. The first body side panel 204 and the second body side panel 206 may be arranged with the truck bed 210 to form sidewalls for the toolbox 100. For example, the body side panels are arranged with the walls of the toolbox 100 to define a closed cavity for receiving contents therein.

The upper rail 40, the upper rail 80, and the toolbox 100 may be formed of an aluminum alloy. Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pickup truck box assembly comprising:
    a bed disposed at a bottom of the pickup truck box assembly, the bed having a forward end, a right side, and a left side;
    a header extending upwardly from the forward end;
    a first side panel secured to the header and extending upwardly from the right side;
    a second side panel secured to the header and extending upwardly from the left side;
    right and left wheel wells extending upwardly from the bed to a first height and inwardly from the first and second side panels, respectively;
    an upper rail secured to an upper end of the header; and
    a toolbox integrated with the upper rail, the toolbox defining a channel extending between the first and second side panels, wherein a bottom surface of the toolbox is spaced above the bed to a second height that is greater than the first height, and wherein the upper rail and the toolbox are formed by extrusion as a single component.

2. A pickup truck box assembly comprising:
    a bed disposed at a bottom of the pickup truck box assembly, the bed having a forward end, a right side, and a left side;
    a header extending upwardly from the forward end;
    a first side panel secured to the header and extending upwardly from the right side;
    a second side panel secured to the header and extending upwardly from the left side;
    right and left wheel wells extending upwardly from the bed to a first height and inwardly from the first and second side panels, respectively;
    an upper rail secured to an upper end of the header;
    a toolbox integrated with the upper rail, the toolbox defining a channel extending between the first and second side panels, wherein a bottom surface of the toolbox is spaced above the bed to a second height that is greater than the first height; and a toolbox lid, wherein the toolbox lid is mounted to the upper rail for pivotal movement between at least a closed position in which access to the channel is prevented and an open position in which access to the channel is provided.

\* \* \* \* \*